United States Patent
Shirasawa

(10) Patent No.: US 6,866,608 B2
(45) Date of Patent: Mar. 15, 2005

(54) PLANETARY GEAR DEVICE

(75) Inventor: Naomi Shirasawa, Nagano-ken (JP)

(73) Assignee: Harmonic Drive Systems, Inc., Tokyo (JP)

( * ) Notice: Subject to any disclaimer, the term of this patent is extended or adjusted under 35 U.S.C. 154(b) by 0 days.

(21) Appl. No.: 10/432,399

(22) PCT Filed: Dec. 4, 2002

(86) PCT No.: PCT/JP02/12728

§ 371 (c)(1),
(2), (4) Date: Jul. 23, 2003

(87) PCT Pub. No.: WO03/050435

PCT Pub. Date: Jun. 19, 2003

(65) Prior Publication Data

US 2004/0048715 A1 Mar. 11, 2004

(30) Foreign Application Priority Data

Dec. 11, 2001 (JP) ........................ 2001-376691

(51) Int. Cl.$^7$ ............................ F16H 1/28; F16H 57/08
(52) U.S. Cl. ........................................ 475/331; 475/346
(58) Field of Search ................................. 475/331, 346

(56) References Cited

U.S. PATENT DOCUMENTS

| | | | | |
|---|---|---|---|---|
| 3,315,546 A | * | 4/1967 | Fritsch | 475/346 |
| 4,789,254 A | * | 12/1988 | Marquardt et al. | 384/611 |
| 5,295,925 A | * | 3/1994 | Hirabayashi | 475/331 |
| 5,813,938 A | * | 9/1998 | Forster | 475/331 |
| 5,957,804 A | | 9/1999 | Schulz et al. | |
| 6,033,336 A | * | 3/2000 | Bae | 475/341 |
| 6,099,432 A | * | 8/2000 | Shirokoshi | 475/331 |
| 2004/0081379 A1 | * | 4/2004 | Shirasawa | 384/461 |

FOREIGN PATENT DOCUMENTS

| | | | | |
|---|---|---|---|---|
| JP | 42-14050 | | 8/1967 | |
| JP | 50-102763 | | 8/1975 | |
| JP | 56-083642 | | 7/1981 | |
| JP | 62-75263 | | 5/1987 | |
| JP | 63-013939 | | 1/1988 | |
| JP | 02283939 A | * | 11/1990 | F16H/1/28 |

* cited by examiner

Primary Examiner—Richard M. Lorence
(74) Attorney, Agent, or Firm—Darby & Darby

(57) ABSTRACT

A planetary gear device includes a first, a second, and a third ring-shaped member that are concentrically arranged in that order from the inside. A sun gear is coaxially fixed to an end surface of the first ring-shaped member, planet shafts of planet gears are supported on an end surface of the ring-shaped member, and an internal gear is coaxially fixed to an end surface of the third ring-shaped member. A first cross roller bearing is formed between the first and second ring-shaped members and a second cross roller bearing is formed between the second and third ring-shaped members. Each member is arranged concentrically on a plane that is perpendicular to the device axis, so that a planetary gear device that is extremely slim in the device axial direction can be realized. Since the respective gear parts can be accessed from both sides in the device axial direction, the input and output can be laid out with great freedom.

13 Claims, 4 Drawing Sheets

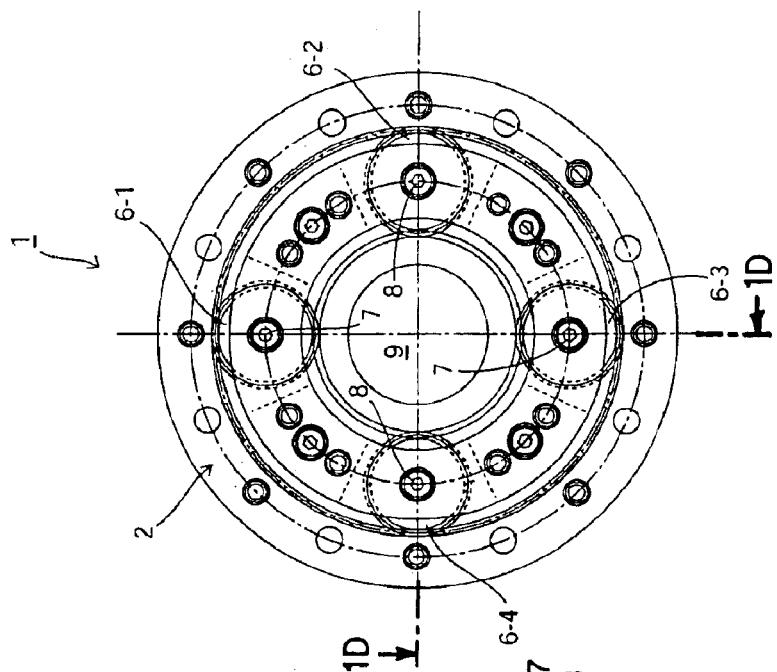
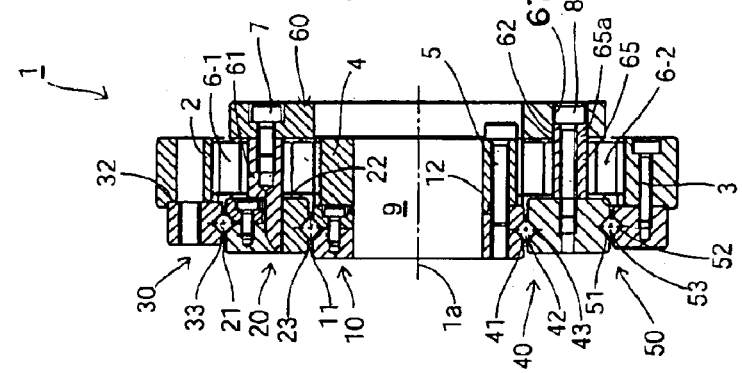
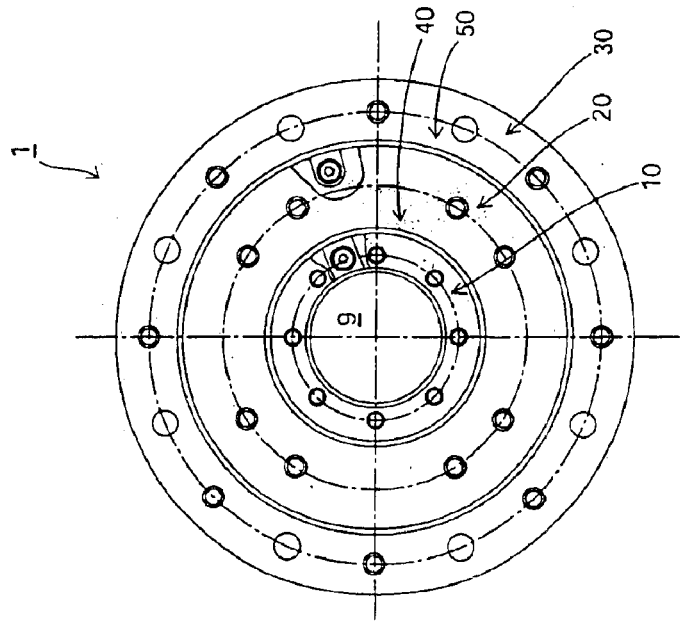

PLANETARY GEAR DEVICE

TECHNICAL FIELD

The present invention relates to a small, compact planetary gear device and in particular to a planetary gear device with reduced thickness in the device axial direction.

RELATED ART

A conventional planetary gear device is composed of a reduction mechanism for reducing the speed of an input high-speed rotation and a bearing for rotatably supporting a reduced-speed rotation output member that outputs the rotation whose speed is reduced by the reduction mechanism. The reduction mechanism and the bearing are disposed coaxially along the device axial direction.

However, the above structure is not suited to constituting a flat planetary gear device with reduced thickness in the direction of the device axis.

DISCLOSURE OF THE INVENTION

It is an object of the present invention to provide a planetary gear device with minimal thickness in the device axial directions.

To achieve the above and other objects, a planetary gear device of the present invention includes: a first member that has a ring shape or columnar shape and has a circular outer circumferential surface; a second ring-shaped member disposed concentrically so as to surround the circular outer circumferential surface of the first member; a third ring-shaped member disposed concentrically so as to surround a circular outer circumferential surface of the second ring-shaped member; an internal gear that is coaxially attached to one ring-shaped end surface of the third ring-shaped member; a sun gear that is coaxially attached to an end surface, which is columnar or ring-shaped, of the first member; a plurality of planet gears that are attached to a ring-shaped end surface of the second ring-shaped member and engage with the internal gear and with the sun gear; a first bearing formed between the circular outer circumferential surface of the first member and a circular inner circumferential surface of the second ring-shaped member; and a second bearing formed between a circular outer circumferential surface of the second ring-shaped member and a circular inner circumferential surface of the third ring-shaped member.

Here, it is preferable for at least one of the first bearing and the second bearing to be a cross roller bearing.

In a planetary gear device having the above structure, the sun gear, the planet gears, and the internal gear are supported by the first member, the second ring-shaped member and the third ring-shaped member that are arranged concentrically on a single plane perpendicular to the device axis. Two bearings, for example, cross roller bearings, are concentrically formed between these members. Accordingly, it is possible to realize a structure where a reduction mechanism part, which is composed of the sun gear, the planet gears and the internal gear, and two bearings for supporting these components rotate relative to one another, are concentrically arranged on a plane perpendicular to the device axis. As a result, a planetary gear device that is extremely slim in the device axial direction can be realized. By using hollow parts as the sun gear and the first member that are located on the very inside, a hollow-type planetary gear device can also be realized easily.

In order to reduce the number of components and make the device smaller, more compact, and less expensive, it is preferable to form the first member and the sun gear from a single member having a ring shape or columnar shape, to form an inner ring-side raceway groove of the first bearing in an outer circumferential surface part of a circular outer circumferential surface of the single member on one side in a device axial direction, and to form external teeth that compose the sun gear in an outer circumferential surface part on another side of the single member.

For the same object, it is preferable to form the third ring-shaped member and the internal gear from a single ring-shaped member, to form an outer ring-side raceway groove of the second bearing in an inner circumferential surface part of a circular inner circumferential surface of the single ring-shaped member on one side in the device axial direction, and to form internal teeth that compose the internal gear in an inner circumferential surface part on another side of the single ring-shaped member.

A scissors-type backlash adjusting mechanism can be attached to the planetary gear device of the present invention in the following way. Namely, the planetary gear device may further include a fourth ring-shaped member that supports the planet gears from an opposite side to the second ring-shaped member in the device axial direction, wherein the planet gears include four planet gears that are disposed at intervals of an equal angle, and planet shafts of two planet gears that are disposed at an interval of 180 degrees are supported between the second ring-shaped member and the fourth ring-shaped member so that an angular position in a circumferential direction relative to planet shafts of two other planet gears that are also disposed at an interval of 180 degrees, can be adjusted.

The following construction may be used to produce a multi-stage planetary gear device, such as a two-stage planetary gear device.

This is to say, a two-stage planetary gear device according to the present invention has the above-mentioned structure, and wherein the first member and the sun gear are ring-shaped members, a fifth member having a circular outer circumferential surface is concentrically disposed inside a circular inner circumferential surface of the first member, a front stage-side internal gear is formed in a circular inner circumferential surface of the sun gear, a front stage-side sun gear is coaxially attached to one end surface of the fifth member in the device axial direction, a plurality of front stage-side planet gears engaged with the front stage-side internal gear and with the front stage-side sun gear are disposed between the front stage-side internal gear and the front stage-side sun gear, and a third bearing is formed between the circular outer circumferential surface of the fifth member and the circular inner circumferential surface of the first member.

In the above case also, it is preferable for the third bearing to be a cross roller bearing.

In an planetary gear device of the above construction, the planetary gear mechanism of the front stage side is also constructed on the same plane that is perpendicular to the device axis, so that the entire construction is extremely slim in the device axial direction.

In this case, the number of components can be reduced by coaxially attaching a central rotational shaft to another end surface of the fifth member in the device axial direction.

In order to further decrease the number of components, it is also preferable to form the fifth member, the central rotational shaft, and the front stage-side sun gear from a single member.

BRIEF DESCRIPTION OF THE DRAWINGS

FIGS. 1A, 1B, 1C and 1D are respectively a cross-sectional view, a left end view, a right end view, and a second cross-sectional view alone line 1D showing a planetary gear device according to a first embodiment of the present invention.

BEST MODE FOR CARRYING OUT THE PRESENT INVENTION

With reference to the attached drawings, there will be described embodiments of a planetary gear device according to the present invention.

First Embodiment

Figure 1D:
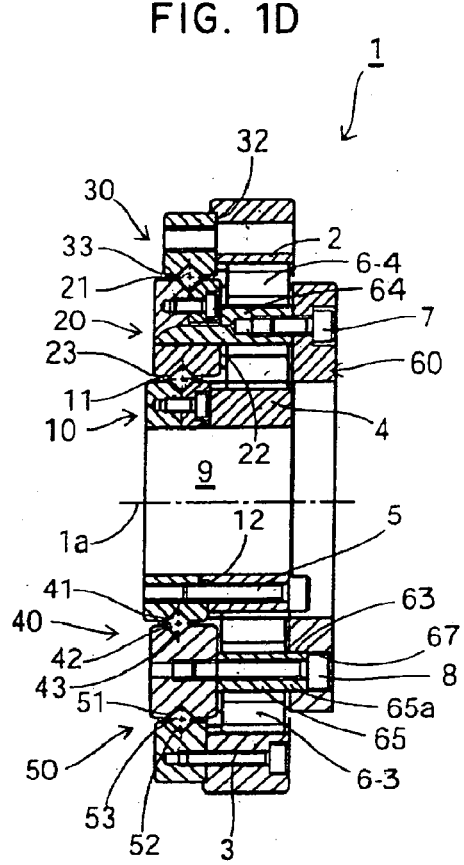

FIGS. 1A, 1B and 1C are a cross-sectional view, a left end view, and a right end view showing a planetary gear device according to a first embodiment of the present invention. As shown in these drawings, a planetary gear device 1 of the present embodiment includes a first ring-shaped member 10, a second ring-shaped member 20 disposed concentrically around a device axis 1a so as to surround a circular outer circumferential surface 11 of the first ring-shaped member 10, and a third ring-shaped member 30 disposed concentrically so as to surround a circular outer circumferential surface 21 of the second ring-shaped member 20.

An internal gear 2 is coaxially fastened onto a ring-shaped end surface 32 of the outermost third ring-shaped member 30 by fixing bolts 3. On the same side of the planetary gear device 1, a cylindrical sun gear 4 is also coaxially fastened onto a ring-shaped end surface 12 of the first ring-shaped member 10 by fixing bolts 5. Between the internal gear 2 and the sun gear 4, a plurality (in the illustrated example, four) of planet gears 6-1 to 6-4 are disposed so as to mesh with the internal gear 2 and the sun gear 4. These planet gears 6-1 to 6-4 are supported rotatably on planet shafts 61 to 64, respectively, these planet shafts been attached to a ring-shaped end surface 22 of the second ring-shaped member 20 that functions as a carrier.

Here, a first cross roller bearing 40 is formed between a circular inner circumferential surface 23 of the second-ring-shaped member 20 and the circular outer circumferential surface 11 of the first ring-shaped member 10 on the very inside. A second cross roller bearing 50 is formed between the circular outer circumferential surface 21 of the second ring-shaped member 20 and the circular inner circumferential surface 33 of the third ring-shaped member 30. Accordingly, these first and second cross roller bearings 40, 50 are formed concentrically about the device axis 1a.

It should be noted that ball bearings or ordinary roller bearings may be used in place of the first cross roller bearing 40 and/or the second cross roller bearing 50.

The first cross roller bearing 40 includes an inner ring-side raceway groove 41 that is formed in the circular outer circumferential surface 11 of the first ring-shaped member 10, an outer ring-side raceway groove 42 that is formed in the circular inner circumferential surface 23 of the second ring-shaped member 20 that functions as a carrier, and a plurality of rollers 43 that are inserted into a ring-shaped raceway formed between the circular outer circumferential surface 11 and the circular inner circumferential surface 23 so that the rotational axes of alternating rollers are perpendicular to one another. In the same way, the second cross roller bearing 50 includes an inner ring-side raceway groove 51 that is formed in the circular outer circumferential surface 21 of the second ring-shaped member 20 that functions as a carrier, an outer ring-side raceway groove 52 that is formed in the circular inner circumferential surface 33 of the third ring-shaped member 30, and a plurality of rollers 53 that are inserted into a ring-shaped raceway formed between the circular outer circumferential surface 21 and the circular inner circumferential surface 33 so that the rotational axes of alternating rollers are perpendicular to one another.

The planetary gear device 1 of the present embodiment includes a scissors-type backlash adjusting mechanism to adjust the backlash in the engagement of the respective gears. The backlash adjusting mechanism in the present embodiment includes a fourth ring-shaped member 60 that supports the planet gears from the opposite side in the device axial direction 1a with respect to the second ring-shaped member 20 that functions as a carrier. The planet shafts 61, 63 (only the planet shaft 61 is shown in FIG. 1A) of two planet gears 6-1, 6-3 that are disposed at an interval of 180 degrees are attached between the second and fourth ring-shaped members 20, 60 so that it is possible to adjust the relative angular position in the circumferential direction between these planet shafts 61, 63 and the planet shafts 62, 64 (only the planet shaft 62 is shown in FIG. 1A) of the remaining two planet gears 6-2, 6-4 that are also disposed at an interval of 180 degrees.

More specifically, at one end, the planet shafts 61, 63 of the two planet gears 6-1, 6-3 are fitted into the ring-shaped end surface 22 of the second ring-shaped member 20 that functions as a carrier, while at the other end, the planet shafts 61, 63 project along the device axial direction 1a and are attached to the fourth ring-shaped member 60 by fastening bolts 7. On the other hand, the planet shafts 62, 64 of two planet gears 6-2, 6-4 are formed of cylindrical collars 65 that are fixed between the second and fourth ring-shaped members 20, 60 by fastening bolts 8. One end 65a of each cylindrical collar 65 is inserted into a slightly larger through-hole 67 formed in the fourth ring-shaped member 60, and is able to move slightly in the circumferential direction relative to the fourth ring-shaped member 60. Accordingly, when the four planet gears 6-1 to 6-4 are fixed to the fourth ring-shaped member 60, by rotating the other two planet gears 6-2 and 6-4 slightly in the circumferential direction relative to the two planet gears 6-1, 6-3 that are tentatively attached, backlash adjustment can be performed for the engaging parts of the gears before the fastening bolts are properly tightened.

In the planetary gear device 1 with the construction described above, the sun gear 4 is usually used as a high-speed rotation input element. One of the internal gear 2 and the second ring-shaped member 20 used as the carrier is usually set as a fixed element with the other being set as a reduced-speed rotation output element. All of these members are concentrically aligned in the radial direction about the device axis 1a, so that a planetary gear device that is extremely slim in the device axial direction 1a can be realized.

By using hollow members as the first ring-shaped member 10 and the sun gear 4 that are disposed on the very inside as in the present embodiment, there is an advantage in that a hollow-type planetary gear device can be easily realized.

On one side in the device axial direction, the end surfaces of the first ring-shaped member 10 that integrally rotates with the sun gear 4, the second ring-shaped member 20 that functions as the carrier of the planet gears, and the third ring-shaped member 30 that integrally rotates with the internal gear 2 are all exposed. On the other side, the end surfaces of the sun gear 4, the fourth ring-shaped member 60 that integrally rotates with the carrier of the planet gears, and the internal gear 2 are exposed. Accordingly, another members can be connected to the respective rotating parts on either side in the device axial direction. This means that there is an advantage that the input and output can be easily made from either side.

Modification of the First Embodiment

Here, in order to reduce the number of components in the above example and simplify and reduce the cost of the assembly process for the device, the first ring-shaped member 10 and the sun gear 4 may be formed of a single member.

Figure 2C:
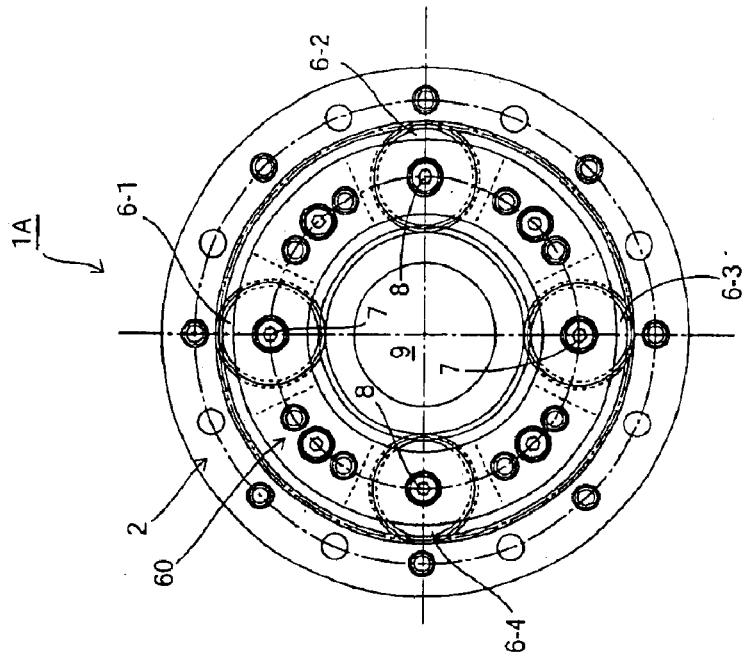
FIGS. 2A, 2B and 2C are respectively a cross-sectional view, a left end view, and a right end view showing a modified embodiment of the planetary gear device of FIGS. 1A to 1D.
Figure 2A:
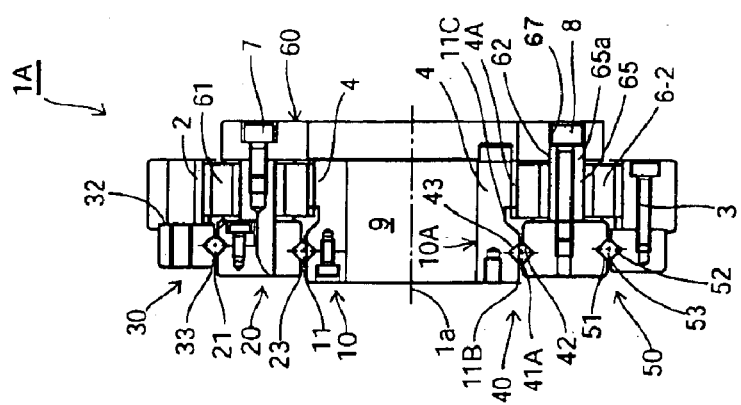
Figure 2B:
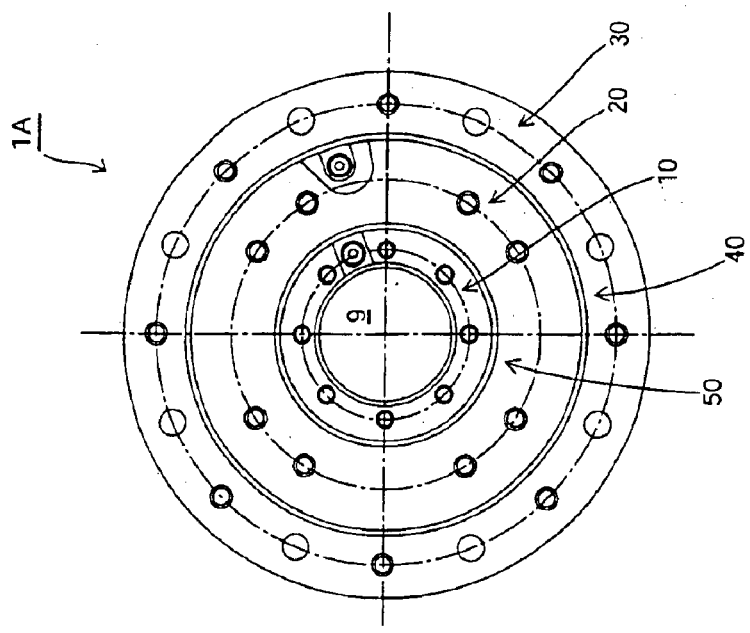

FIGS. 2A, 2B and 2C are a cross-sectional view, a left end view, and a right end view showing a modification of the planetary gear device of the first embodiment with the construction described above. The fundamental structure of the planetary gear device 1A is the same as that of the planetary gear device 1, so that corresponding parts are given the same reference numerals and description thereof will be omitted.

In the planetary gear device 1A of the present modification, the first ring-shaped member 10 and the sun gear 4 are formed of a single ring-shaped member 10A. An inner ring-side raceway groove 41A of the first cross roller bearing 40 is formed in an outer circumferential surface part 11B of the circular outer circumferential surface of the ring-shaped member 10A on one side in the device axial direction, while on the other side, external teeth 4A that compose the sun gear 4 are formed in an outer circumferential surface part 11C.

Figure 4:
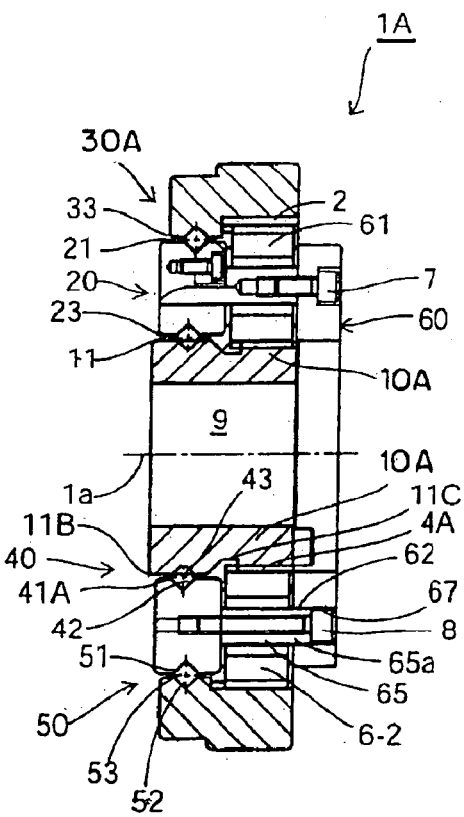
FIG. 4 is a cross-sectional view showing a second modified embodiment of the planetary gear device of FIGS. 1A to 1D.

It should be noted that in addition to the above structure, or separate to the above structure, FIG. 4 illustrates that the third ring-shaped member 30 and the internal gear 2 may also be formed of a single ring-shaped member 30A. In this case, the outer ring-side raceway groove 52 of the second cross roller bearing 50 may be formed in an inner circumferential surface part of the circular inner circumferential surface of this ring-shaped member on one side in the device axial direction, while on the other side, the internal teeth that compose the internal gear 2 may be formed in an inner circumferential surface part.

In each of the examples described above, a central hollow 9 that passes through the center of the device is formed by the sun gear 4 and the first ring-shaped member 10. As an alternative, a solid cylindrical member or a solid disc-shaped member may be used as the sun gear 4 and the first ring-shaped member 10.

Second Embodiment

Figure 3C:
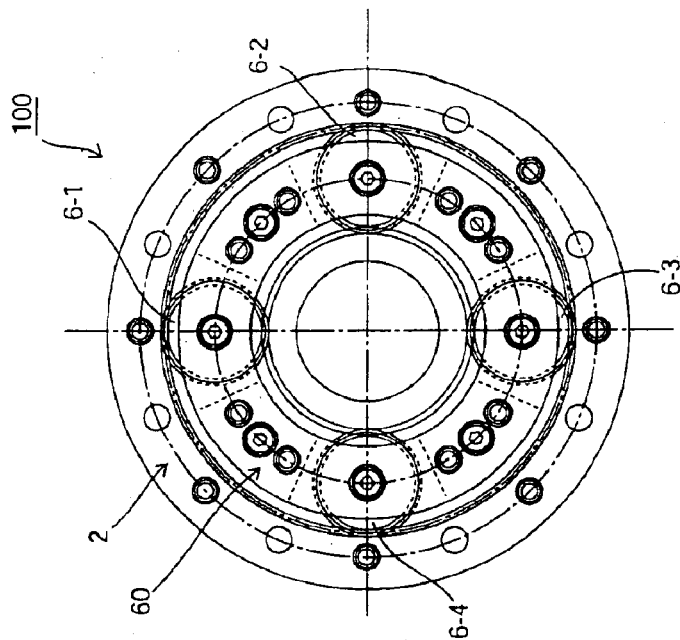
FIGS. 3A, 3B and 3C are respectively a cross-sectional view, a left end view, and a right end view showing a two-stage planetary gear device according to a second embodiment of the present invention.
Figure 3A:
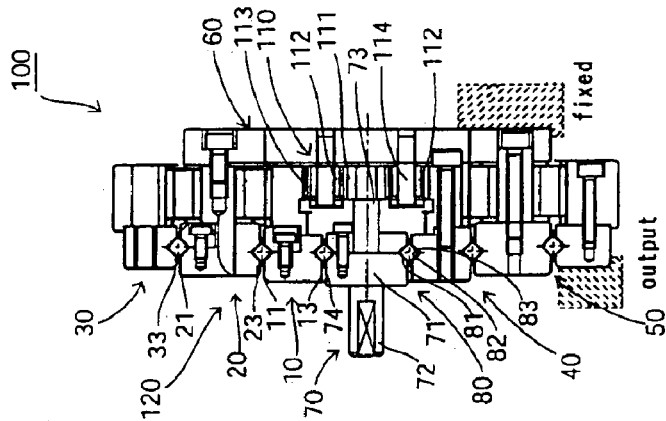
Figure 3B:
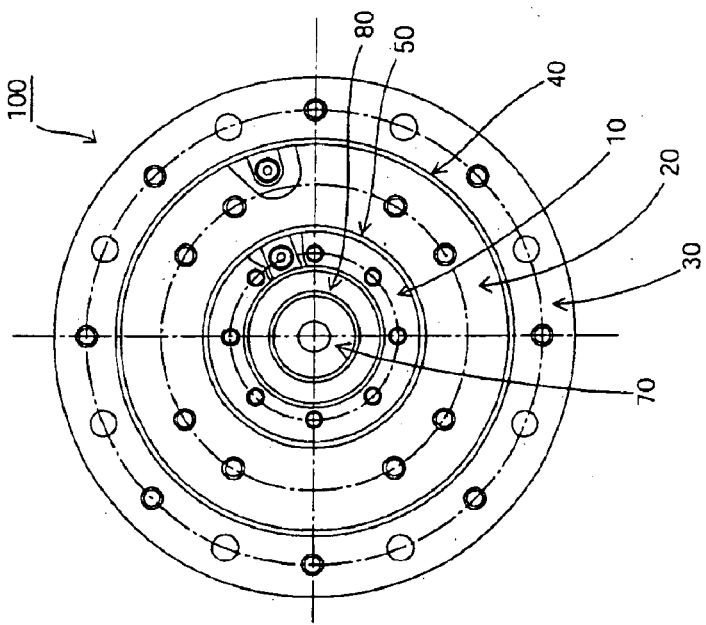

FIGS. 3A, 3B and 3C are a cross-sectional view, a left end view, and a right end view showing a two-stage planetary gear device that is constituted by the planetary gear device 1 of the first embodiment. The two-stage planetary gear device 100 includes a front stage-side planetary gear mechanism 110 and a rear stage-side planetary gear mechanism 120. The rear stage-side planetary gear mechanism 120 has substantially the same construction as the planetary gear device 1 of the first embodiment. Accordingly, the corresponding parts are given the same reference numerals and description thereof will be omitted.

In the two-stage planetary gear device 100 of the present embodiment, a central rotational shaft 70 (the fifth member) is concentrically disposed rotatably on the inside of a circular inner circumferential surface 13 of the first ring-shaped member 10 in the rear stage planetary gear mechanism 120. This central rotational shaft 70 is composed of a large-diameter disc-shaped part 71, a small-diameter input shaft part 72 that coaxially projects from one end surface of the disc-shaped part 71, and a small-diameter pinion shaft part 73 that concentrically projects from the opposite end surface of the disc-shaped part 71.

A third cross roller bearing 80 is formed between a circular outer circumferential surface 74 of the disc-shaped part 71 and the circular inner circumferential surface 13 of the first ring-shaped member 10. More specifically, the third cross roller bearing 80 includes an inner ring-side raceway groove 81 that is formed in the circular outer circumferential surface 74 of the disc-shaped part 71, an outer ring-side raceway groove 82 that is formed in the circular inner circumferential surface 13 of the first ring-shaped member 10, and a plurality of rollers 83 that are inserted into a ring-shaped raceway formed between the circular outer circumferential surface 74 and the circular inner circumferential surface 13 so that the rotational axes of alternating rollers are perpendicular to one another.

Figure 5:
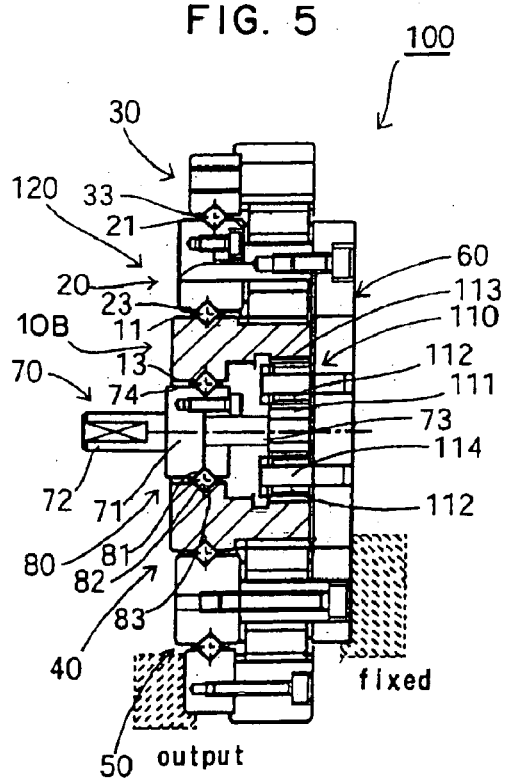
FIG. 5 is a cross-sectional view showing a modified second embodiment of the planetary gear device of FIGS. 3A to 3D.

The front stage-side planetary gear mechanism 110 includes a front stage-side sun gear 111 formed in a front end part of the pinion shaft 73, a plurality of front stage-side planet gears 112 disposed on the outside of the front stage-side sun gear 111, and a front stage-side internal gear 113 formed in a circular inner circumferential surface of the sun gear 4 of the rear stage-side that surrounds these front stage-side planet gears 112 to the outside. Planet shafts 114 of the front stage-side planet gears 112 are supported in a cantilevered manner by the fourth ring-shaped member 60. Further, FIG. 5 illustrates the first ring-shaped member 10 and the sun gear 4 formed from a single member 10B having a ring shaped or columnar shape.

It should be noted that in the present embodiment, the input shaft part 72, the disc-shaped part 71 for forming the inner ring of a cross roller bearing, and the pinion shaft part 73 in which the front stage-side sun gear 111 is formed are all formed of a single member, though these parts may be formed of separate members that are coaxially fixed together.

As shown in the drawings, in the two-stage planetary gear device 100 constructed above, the carrier in each stage is usually set as a fixed element, with the internal gear 2 of the rear stage-side planetary gear mechanism 120 being set as the reduced-speed rotation output element. The high-speed rotation inputted from the input shaft part 72 is transmitted via the front stage-side planetary gear mechanism 110 to the rear stage-side planetary gear mechanism 120 and is obtained as a reduced-speed rotation output from the internal gear 2 of the rear stage-side planetary gear mechanism 120.

In the two-stage planetary gear device 100 of the present embodiment also, each gear part is concentrically arranged on a plane that is perpendicular to the device axis 100a. Accordingly, a two-stage planetary gear device that is extremely slim in the device axial direction can be realized.

Also, since each gear of each stage can be accessed from both sides in the device axial direction, there is a further advantage in that it is extremely easy to lay out the input and output.

INDUSTRIAL APPLICABILITY

As described above, the planetary gear device of the present invention is constituted so that the sun gear, the internal gear, the carrier for supporting the planet gears, and two cross roller bearings for supporting these elements in a manner that they are rotatable relative to one another are concentrically arranged on a plane perpendicular to the device axis. Accordingly, with the present invention, a planetary gear device that is extremely slim in the device axial direction can be realized.

Also, according to the present invention, the sun gear, the carrier for supporting the planet gears, and the internal gear can be accessed from both sides in the device axial direction, so that there is the advantage in that the input and output of the device can be freely laid out, which makes the device extremely easy to design.

In addition, there is the advantage that by using hollow members as the sun gear that is disposed on the very inside and the members that are connected to the sun gear, it is easy to realize a hollow-type planetary gear device.

In a two-stage planetary gear device according to the present invention, the front stage-side planetary gear mechanism is incorporated concentrically with the center of the rear stage-side planetary gear mechanism. The cross roller bearing for rotatably supporting the sun gear is also incorporated concentrically with the center of the rear stage-side planetary gear mechanism. Accordingly, with the present invention, a two-stage planetary gear device that is extremely slim in the device axial direction can be realized.

What is claimed is:

1. A planetary gear device comprising:
   a ring-shaped or columnar first member having a circular outer circumferential surface;
   a second ring-shaped member disposed concentrically so as to surround the circular outer circumferential surface of the first member;
   a third ring-shaped member disposed concentrically so as to surround a circular outer circumferential surface of the second ring-shaped member;
   an internal gear coaxially attached to one ring-shaped end surface of the third ring-shaped member;
   a sun gear coaxially attached to an end surface, which is circular or ring-shaped, of the first member;
   a plurality of planet gears that are attached to a ring-shaped end surface of the second ring-shaped member and engage with the internal gear and the sun gear;
   a first bearing formed between the circular outer circumferential surface of the first member and a circular inner circumferential surface of the second ring-shaped member; and
   a second bearing formed between a circular outer circumferential surface of the second ring-shaped member and a circular inner circumferential surface of the third ring-shaped member,
   wherein the first member and the sun gear are formed from a single member having a ring shape or columnar shape, and an inner ring-side raceway groove of the first bearing is formed in an outer circumferential surface part of a circular outer circumferential surface of the single member on one side in a device axial direction, and external teeth that compose the sun gear are formed in an outer circumferential surface part on the other side of the single member.

2. A planetary gear device according to claim 1, wherein at least one of the first bearing and the second bearing is a cross roller bearing.

3. A planetary gear device comprising:
   a ring-shaped or columnar first member having a circular outer circumferential surface;
   a second ring-shaped member disposed concentrically so as to surround the circular outer circumferential surface of the first member;
   a third ring-shaped member disposed concentrically so as to surround a circular outer circumferential surface of the second ring-shaped member;
   an internal gear coaxially attached to one ring-shaped end surface of the third ring-shaped member;
   a sun gear coaxially attached to an end surface, which is circular or ring-shaped, of the first member;
   a plurality of planet gears that are attached to a ring-shaped end surface of the second ring-shaped member and engage with the internal gear and the sun gear;
   a first bearing formed between the circular outer circumferential surface of the first member and a circular inner circumferential surface of the second ring-shaped member; and
   a second bearing formed between a circular outer circumferential surface of the second ring-shaped member and a circular inner circumferential surface of the third ring-shaped member,
   wherein the third ring-shaped member and the internal gear are formed from a single ring-shaped member, and an outer ring-side raceway groove of the second bearing is formed in an inner circumferential surface part of a circular inner circumferential surface of the single ring-shaped member on one side in the device axial direction, and internal teeth that compose the internal gear are formed in an inner circumferential surface part on the other side of the single ring-shaped member.

4. A planetary gear device according to claim 1, further comprising a fourth ring-shaped member that supports the planet gears from an opposite side to the second ring-shaped member in the device axial direction, wherein the planet gears include four planet gears that are disposed at intervals of an equal angle, and planet shafts of two planet gears disposed at an interval of 180 degrees are supported between the second ring-shaped member and the fourth ring-shaped member so that an angular position in a circumferential direction relative to planet shafts of two other planet gears, out of the four planet gears, that are also disposed at an interval of 180 degrees can be adjusted.

5. A planetary gear device according to claim 3, wherein at least one of the first bearing and the second bearing is a cross roller bearing.

6. A planetary gear device according to claim 3, further comprising a fourth ring-shaped member that supports the planet gears from an opposite side to the second ring-shaped member in the device axial direction, wherein the planet gears include four planet gears that are disposed at intervals of an equal angle, and planet shafts of two planet gears disposed at an interval of 180 degrees are supported between the second ring-shaped member and the fourth ring-shaped member so that an angular position in a circumferential direction relative to planet shafts of two other planet gears, out of the four planet gears, that are also disposed at an interval of 180 degrees can be adjusted.

7. A planetary gear device comprising:
   a ring-shaped or columnar first member having a circular outer circumferential surface;
   a second ring-shaped member disposed concentrically so as to surround the circular outer circumferential surface of the first member;
   a third ring-shaped member disposed concentrically so as to surround a circular outer circumferential surface of the second ring-shaped member;

an internal gear coaxially attached to one ring-shaped end surface of the third ring-shaped member;

a sun gear coaxially attached to an end surface, which is circular or ring-shaped, of the first member;

a plurality of planet gears that are attached to a ring-shaped end surface of the second ring-shaped member and engage with the internal gear and the sun gear;

a first bearing formed between the circular outer circumferential surface of the first member and a circular inner circumferential surface of the second ring-shaped member; and a second bearing formed between a circular outer circumferential surface of the second ring-shaped member and a circular inner circumferential surface of the third ring-shaped member, wherein the first member and the sun gear are ring-shaped members, a fifth member that has a circular outer circumferential surface is concentrically disposed inside a circular inner circumferential surface of the first member, a front stage-side internal gear is formed in a circular inner circumferential surface of the sun gear, a front stage-side sun gear is coaxially attached to one end surface of the fifth member in the device axial direction, a plurality of front stage-side planet gears engaged with the front stage-side internal gear and with the front stage-side sun gear are disposed between the front stage-side internal gear and the front stage-side sun gear, and a third bearing is formed between the circular outer circumferential surface of the fifth member and the circular inner circumferential surface of the first member.

8. A planetary gear device according to claim 7, wherein at least one of the first bearing, the second bearing, and the third bearing is a cross roller bearing.

9. A planetary gear device according to claim 8, wherein a central rotational shaft is coaxially attached to another end surface of the fifth member in the device axial direction.

10. A planetary gear device according to claim 9, wherein the fifth member, the central rotational shaft, and the front stage-side sun gear are formed from a single member.

11. An planetary gear device according to claim 7, wherein the first member and the sun gear are formed from a single member having a ring shaped or columnar shape, and an inner ring-side raceway groove of the first bearing is formed in an outer circumferential surface part of a circular outer circumferential surface of the single member on one side in the device axial direction, and external teeth that compose the sun gear are formed in an outer circumferential surface part on another side of the single member.

12. A planetary gear device according to claim 7, wherein the third ring-shaped member and the internal gear are formed from a single ring-shaped member, and an outer ring-side raceway groove of the second bearing is formed in an inner circumferential surface part of a circular inner circumferential surface of the single ring-shaped member on one side in the device axial direction, and internal teeth that compose the internal gear are formed in an inner circumferential surface part on another side of the single ring-shaped member.

13. A planetary gear device according to claim 7, further comprising a fourth ring-shaped member that supports the planet gears from an opposite side to the second ring-shaped member in the device axial direction, wherein the planet gears include four planet gears that are disposed at intervals of an equal angle, and planet shafts of two planet gears that are disposed at an interval of 180 degrees are supported between the second ring-shaped member and the fourth ring-shaped member so that an angular position in a circumferential direction relative to planet shafts of two other planet gears disposed at an interval of 180 degrees, can be adjusted.

* * * * *